C. W. DURNFORD.
ELECTRIC MOTOR.
APPLICATION FILED DEC. 6, 1917.
1,377,325.
Patented May 10, 1921.
2 SHEETS—SHEET 1.
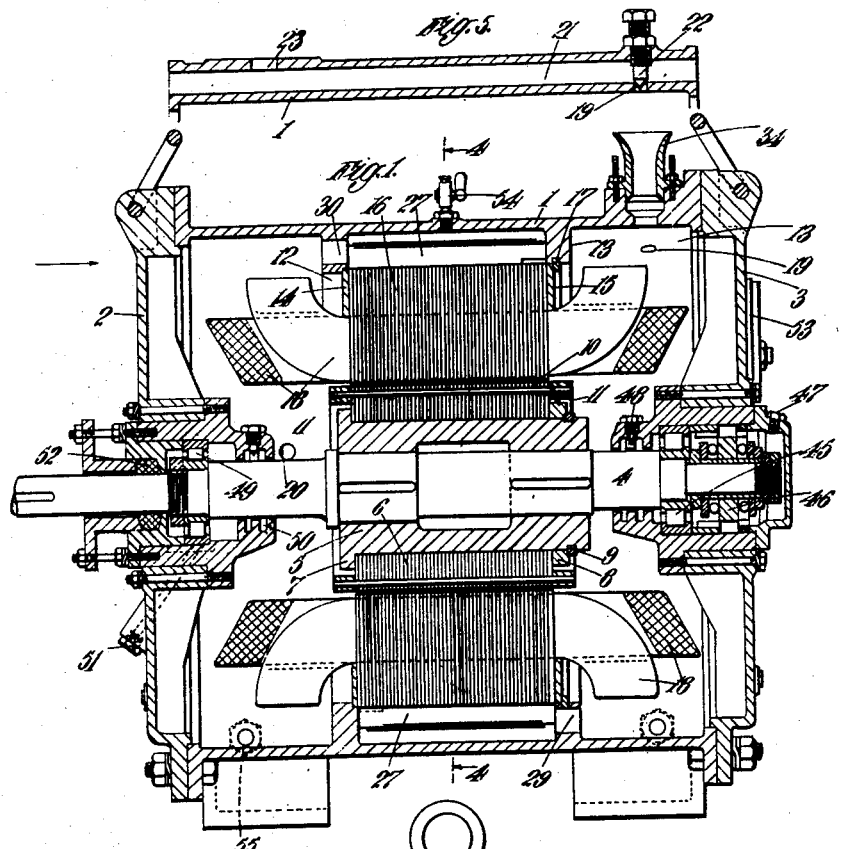
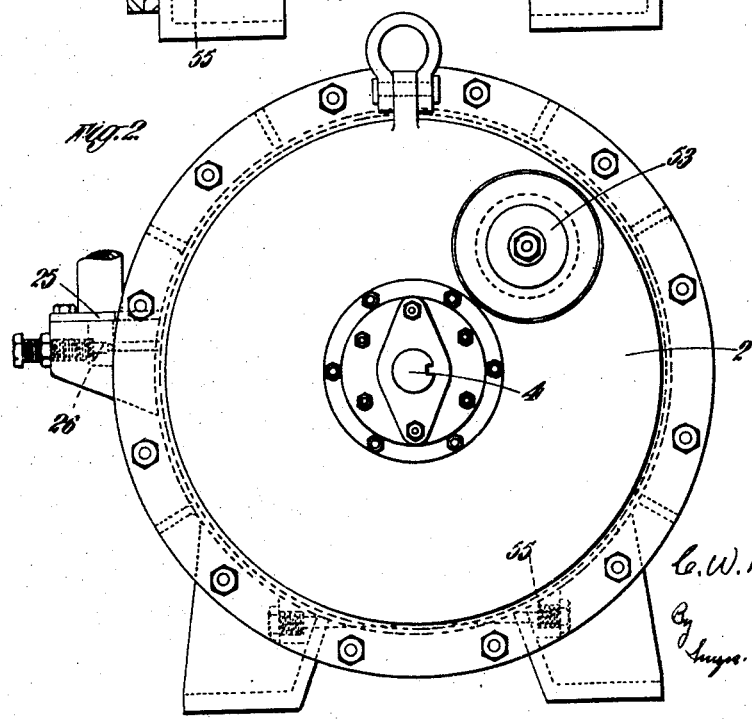

C. W. DURNFORD.
ELECTRIC MOTOR.
APPLICATION FILED DEC. 6, 1917.
1,377,325.
Patented May 10, 1921.
2 SHEETS—SHEET 2.
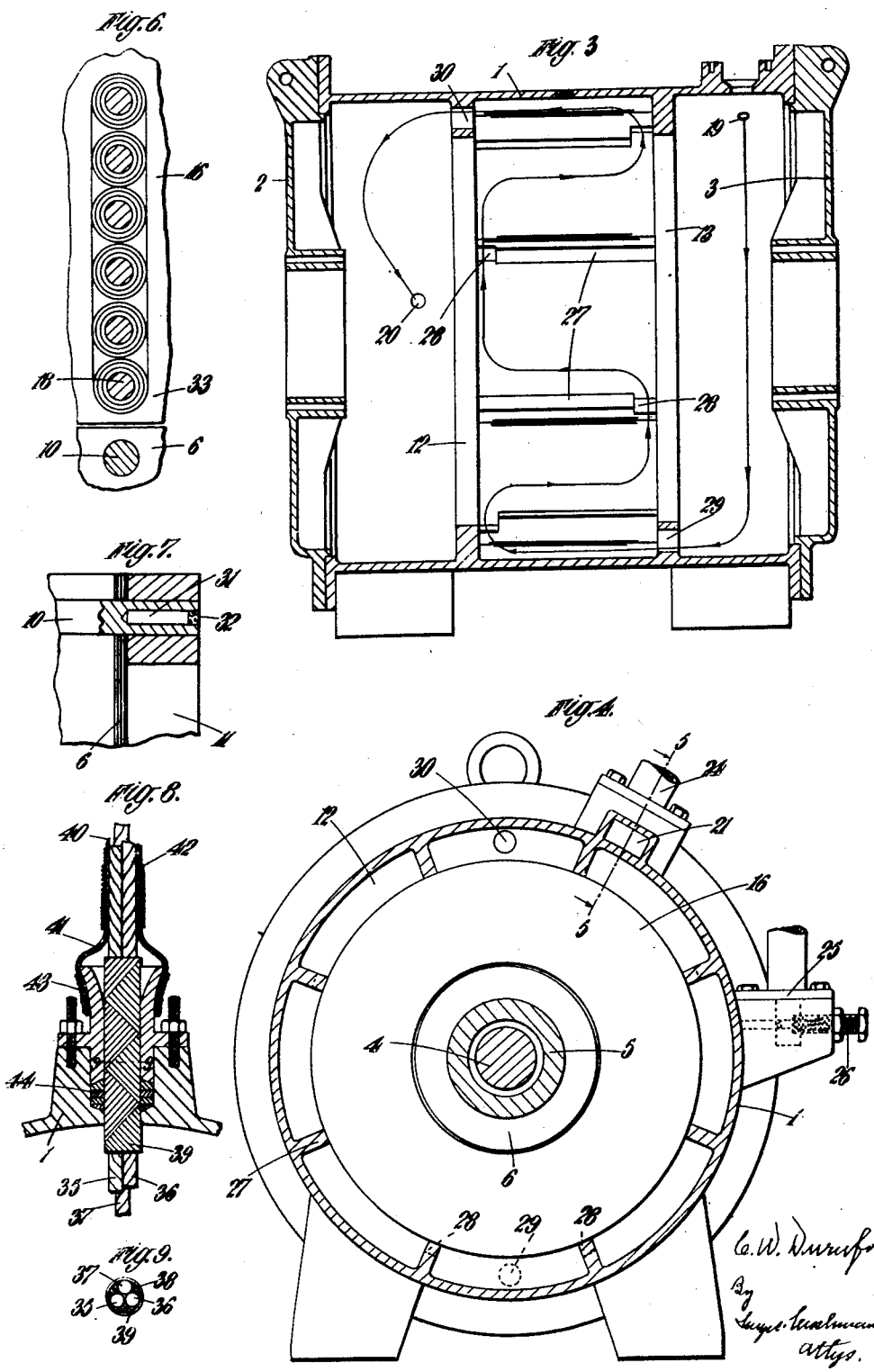

UNITED STATES PATENT OFFICE.

CHARLES WRIGHT DURNFORD, OF WEST EALING, ENGLAND, ASSIGNOR TO SUBMERSIBLE & J-L MOTORS, LIMITED, OF SOUTHALL, ENGLAND.

ELECTRIC MOTOR.

1,377,325.  Specification of Letters Patent.  Patented May 10, 1921.

Application filed December 6, 1917. Serial No. 205,871.

*To all whom it may concern:*

Be it known that I, CHARLES WRIGHT DURNFORD, a subject of the King of Great Britain, residing at 4 St. Stephen's avenue, West Ealing, in the county of Middlesex, England, have invented certain new and useful Improvements in or Relating to Electric Motors, of which the following is a specification.

This invention relates to electric motors and more particularly to electric motors of the kind adapted to be operated or run when submerged in water and in which water is or can be admitted to the interior of the motor.

The motor is adapted to have water circulated through its casing, the water coming in contact with the rotor and stator for cooling purposes and one of the chief features of the present invention is the provision of an improved arrangement for guiding or directing the flow of water and also for controlling the amount of water allowed to enter and leave the motor casing.

Another feature of the present invention is the arrangement of the stator windings in their slots whereby there is less liability of these windings to become overheated.

A further feature of the present invention consists in the method of clamping the leads of the motor to the motor casing whereby tension applied to the said leads outside the motor is not transmitted to the stator windings.

The above and other features of the invention will be fully understood from the following description taken in connection with the accompanying drawings which illustrate the preferred construction of a motor according to this invention and in which: —

Figure 1 is a central section of the motor.

Fig. 2 is an end elevation looking in the direction of the arrow X in Fig. 1.

Fig. 3 is a central section of the motor with the stator, rotor, rotor shaft and bearings removed.

Fig. 4 is a section on the line 4—4 in Fig. 1.

Fig. 5 is a part section on the line 5—5 in Fig. 4.

Fig 6 is a section through one of the stator slots on an enlarged scale.

Fig. 7 is a section through one of the rotor bars and end ring on an enlarged scale.

Fig. 8 is a section on an enlarged scale of the cable gland on the motor casing showing the method of fixing the cables.

Fig. 9 is a part section on the line 9—9 in Fig. 8.

The motor is a three phase alternating current induction motor, the rotor being of the squirrel cage type. The motor comprises a cylindrical casing 1 closed by end plates 2 and 3. Mounted in bearings in the end plates is the rotor shaft 4. The rotor comprises a sleeve 5 keyed to the shaft 4 and carrying iron stampings 6 which are clamped between a collar 7 on the sleeve 5 and a ring on the same. The stampings 6 are keyed on the sleeve 5 and the ring 8 is held in position by a spring ring 9. The stampings 6 are coated with waterproof composition and are compressed into position while the composition is wet so that they form a solid mass. Passing through holes in the plates 6 are the rotor bars or conductors in the form of rods 10. The rods 10 are joined at each end to copper rings 11, in a manner hereinafter described, to form a squirrel cage rotor. Two parallel ribs 12 and 13 extend around the inside of the casing 1. Plates 14 and 15 fit into shoulders on the two ribs 12 and 13 respectively and clamp between them the iron stampings 16 of the stator, the plate 15 being held in position by a spring ring 17. The stampings 16 are coated with waterproof composition similarly to the stampings 6 of the rotor. The conductors 18 of the stator pass through slots in the stator as hereinafter described. The conductors 18 are only shown diagrammatically in Fig. 1. For the purpose of circulating water through the motor casing an inlet is provided at 19 and an outlet at 20. A passage 21 for the cooling water is formed integral with the casing 1 (see Figs. 4 and 5) the ends of the passage being closed by the end plates 2 and 3 of the motor casing. The inlet opening 19 to the casing is controlled by a needle valve 22. Water is admitted to the passage 21 through an opening 23, a hose coupling 24 (not shown in Fig. 5) being clamped by screws over this opening. The outlet 20 from the casing leads to a hose coupling 25, and this outlet is controlled by a needle valve 26.

By the provision of valves both at the inlet and outlet to the motor casing both the pressure of supply and the back pressure due to the head of water above the motor when immersed, can be adjusted so that the motor can be efficiently operated at different depths of immersion. If only the inlet were provided with a valve the flow of water through the motor would vary according to the depth of immersion and consequently the cooling effect of the water would vary.

Between the ribs 12 and 13 longitudinal ribs 27 extend, these ribs being cut away as at 28 so as to allow water to pass through said ribs. Water entering through the inlet 19 falls over the ends of the stator windings 18 and passes through an opening 29 in the rib 13. The water then passes upward on both sides of the motor through the chambers formed by the outside of the stator laminations 16, the casing 1 and the ribs 12, 13, and 27. The openings 28 in the ribs 27 being at opposite ends of adjacent ribs, the water follows a zig-zag course until it reaches the top of the motor when it flows through the opening 30 in the rib 12 and leaves by the outlet 20. The water also flows through the gap between the stator and rotor and through the stator slots.

The rotor bars 10 are connected to the short circuiting rings 11 in the following manner. The end of each bar 10 (see Fig. 7) passes through the ring and is drilled to receive a steel pin 31. The pin 31 is driven into the bar 10 acting as a wedge to expand the end of the bar and make a tight fit with the ring 11. The space left beyond the outer end of the pin is filled up with solder 32. The pins 31 may be coated with copper before being driven into the bars 10 and in this case it is not necessary to leave a space beyond the outer end of each pin to receive solder. By the method of joining the rotor bars to the end rings no cavities are left in which corrosion can be set up. This method of joining the rotor bars to the end rings forms the subject of my co-pending application Serial No. 205783.

The conductors of the stator winding are arranged in the slots as shown in Fig. 6. The slots and conductors are of such size that only one conductor is arranged in the breadth of the slot whereby there is less liability of the conductors to become overheated. Further the slots are closed as shown at 33 for the purpose of obtaining strength. The conductors are insulated by vulcanized rubber, there being no layer of unvulcanized rubber between the vulcanized rubber and the conductor as in the method usually adopted in insulating conductors. The conductors consist of a number of twisted thin wires thereby obtaining the necessary flexibility, as owing to closed slots being used coils wound on formers can not be employed and also it is desirable that the conductors should be continuously insulated and consequently they can not be jointed.

The conductors from the stator are led out of the motor for a considerable length (say 50 feet) without any joint, through a gland 34 in the casing 1 (see Figs. 1, 8 and 9). Each of the three conductors 35, 36 and 37 is bound with a layer of vulcanizing tape and strips 38 of any suitable plastic insulating material are cut to fit the spaces between the cables. The whole cable where it passes through the gland is bound with vulcanizing tape 39 and vulcanized to form a three-core cable. This cable is covered throughout its length with a canvas tube 40. The lower end of this tube is split and brought over the mouth piece of the gland. Another short piece of canvas tube 41 is slipped over the mouthpiece and the first mentioned canvas tube and bindings of strong string are applied at 42 and 43. At 44 washers of any suitable plastic insulating material are provided and by tightening up the gland these washers are compressed and expand the cable above and below the washers, thereby insuring a tight fit for the cable in the gland. Any pull applied to the cable outside the motor casing is therefore not transmitted to the motor windings.

The bearings for the shaft 4 are constructed as follows:—The right-hand bearing comprises a roller bearing 45 and a thrust bearing 46. Thick grease is inserted into the bearings through an opening 47 by means of a pump so as to fill the bearing up with the grease. At 48 a water seal filled with grease is provided. The left-hand bearing comprises a roller bearing 49 and a water seal 50 both of which are filled with grease through the opening 51. A stuffing-box or gland 52 is provided at the adjacent end of the shaft to which end the device to be driven by the motor is connected.

Inspection covers are provided in the end plates 2 and 3 of the casing as shown at 53 and a relief cock is provided at 54. Drain plugs are provided at 55.

The submersible motor according to this invention is intended to have water circulated through it for cooling purposes by means of a pump or any other suitable means of obtaining a head of water. The provision of means for controlling the flow of water both at the water inlet and outlet of the motor is particularly advantageous especially for adjusting the motor to work with different heads of water. Or the motor may be operated with the casing merely filled with water. Further the motor can be employed when submerged in water or not.

A motor constructed according to this invention is found to be generally highly efficient and not liable to break down.

What I claim and desire to secure by Letters Patent of the United States is:—

1. A submersible electric motor having a casing and passages whereby cooling fluid can be circulated through the casing and be brought into contact with the operative parts of the motor and in which means are provided for varying the size of the inlet and the size of the outlet for the cooling fluid.

2. A submersible electric motor having a casing and passages whereby cooling fluid can be circulated through the casing and be brought into contact with the operative parts of the motor and in which regulating means are provided both in the inlet and outlet passages for the cooling fluid.

CHARLES WRIGHT DURNFORD.